US006070458A

United States Patent [19]

Nawa et al.

[11] Patent Number: 6,070,458

[45] Date of Patent: Jun. 6, 2000

[54] THROTTLE VALVE OPENING DETECTING DEVICE

[75] Inventors: Hideaki Nawa, Obu; Sadao Takaki, Ikeda; Katsuyuki Kajitani, Ikeda; Atsushi Ito, Ikeda; Haruhiko Nishino, Ikeda; Masao Takeda, Ikeda, all of Japan

[73] Assignee: Aisan Kogyo Kabushiki Kaisha, Japan

[21] Appl. No.: 08/974,152

[22] Filed: Nov. 19, 1997

[30] Foreign Application Priority Data

Nov. 22, 1996 [JP] Japan ........ 8-311899

[51] Int. Cl.[7] ........ G01M 15/00

[52] U.S. Cl. ........ 73/118.2

[58] Field of Search ........ 73/118.2, 112, 73/116, 117.2, 117.3, 118.1

[56] References Cited

U.S. PATENT DOCUMENTS

| | | | |
|---|---|---|---|
| 4,679,440 | 7/1987 | Okamura | 73/118.1 |
| 4,930,079 | 5/1990 | Kondo | 73/118.1 |
| 5,113,692 | 5/1992 | Kouta | 73/117.3 |
| 5,127,263 | 7/1992 | Iizuka | 73/118.1 |
| 5,157,956 | 10/1992 | Isaji et al. | 73/118.1 |
| 5,220,828 | 6/1993 | Sodeno et al. | 73/118.1 |
| 5,597,951 | 1/1997 | Yoshizaki et al. | 73/118.2 |

FOREIGN PATENT DOCUMENTS

| | | |
|---|---|---|
| 62-81004 | 5/1987 | Japan . |
| 3-281947 | 12/1991 | Japan . |

*Primary Examiner*—Eric S. McCall

*Attorney, Agent, or Firm*—Finnegan, Henderson, Farabow, Garrett & Dunner, L.L.P.

[57] ABSTRACT

According to the device of the invention, measured values ($V_0$', V') of an output $V_A$ of an opening sensor at two adjusted levels of throttle openings in both idling state and fast idling state and their ideal values ($V_0$, V) are used. The value $V_0$' in the idling state is subtracted from the output $V_A$ in a driving condition, ($V_A$−$V_0$'), which is then multiplied by the ratio of ideal variation characteristics of the sensor output for a change of the throttle opening to those in the throttle valve product used, $\{(V-V_0)/(V'-V_0')\}$, to produce a correction signal $T_A$ matching the individual difference. Further, a reference value subtracted from the output $V_A$ in a driving condition is set as $T_{AMIN}$ which varies with the output $V_A$, taking the difference of variation characteristics of the sensor output from ideal characteristics into account.

16 Claims, 8 Drawing Sheets

THROTTLE VALVE OPENING DETECTING DEVICE

BACKGROUND OF THE INVENTION

1. Field of the Invention

The present invention relates to a device for detecting the opening of a throttle valve which adjusts the intake volume for an engine. More particularly, the present invention is concerned with a throttle valve opening detecting device capable of correcting an individual difference between individual throttle valve products to effect a highly accurate detection of throttle valve opening.

2. Description of the Related Art

FIG. 8 shows schematically the appearance of a conventional device for detecting the opening of a throttle valve. In this conventional device, mounting holes of an opening sensor 91 for a throttle body are formed as long holes to permit adjustment of the mounting angle. In the interior of the opening sensor 91 are mounted a substrate 80 and a slider 83 connected to the throttle valve. A conductor pattern 81 and a resistor pattern 82 are formed on the substrate 80 in such a double arc shape as shown in FIG. 6. The substrate 80 is fixed to an outer frame of the opening sensor 91, both ends of the resistor pattern 82 are connected to terminals 84 and 86, and the conductor pattern 81 is connected to a terminal 85. On the other hand, both ends of the slider 83 are in contact at both ends thereof with the conductor pattern 81 and the resistor pattern 82, and the contact positions thereof shift with movement of the throttle valve. Since a supply voltage $V_{SS}$ is applied to the terminals 84 and 86, a voltage $V_A$ obtained by dividing the supply voltage $V_{SS}$ by the resistor pattern 82 and the slider 83 appears at the terminal 85 through the conductor pattern 81. Since the voltage $V_A$ differs depending on the opening of the throttle valve, it can be used as a signal for detecting the opening of the throttle valve.

The throttle body and the opening sensor 91 each involve an individual difference based on, for example, machining accuracy within the tolerance of their components. Therefore, the characteristic of the voltage $V_A$ for the opening of the throttle valve does not strictly agree with that of another throttle valve product. Therefore, an ideal product constituted by only ideally machined components is provided, then the voltage $V_A$ is measured at a throttle opening which affords an intake volume (2 $m^3$/h at a bore of 35 mmϕ and a negative pressure of 60 kPa, for example) corresponding to an idling condition. The throttle opening will hereinafter be referred to as "fully closed" for convenience' sake. The voltage thus measured is recorded as $V_0$. Then, the throttle opening is adjusted so that the same intake volume is obtained with an actual product, and the mounting angle of the opening sensor 91 for the throttle body is adjusted so that the voltage $V_A$ becomes $V_0$ in this condition.

If this adjustment is made, the detected voltage $V_A$ in idling becomes $V_0$ for all the products irrespective of an individual difference among the products. In actual operation, therefore, the value ($V_A-V_0$) obtained by subtracting $V_0$ from the detected voltage $V_A$ is used as a detection signal $T_A$. The detection signal $T_A$ can be converted to the opening of the throttle valve by multiplication using an appropriate coefficient. The throttle valve opening thus calculated is employable in calculating the fuel injection volume or in various controls, including control of the speed changing operation of an automatic transmission. Examples of such a throttle valve opening detecting device are disclosed in Japanese Utility Model Laid Open No. 62-81004 (with an idling switch) and Japanese Patent Laid Open No. 3-281947 (without an idling switch).

However, the following problems are encountered in the conventional throttle valve opening detecting device described above. In the conventional device, it is only in the fully closed state of the throttle valve that an individual difference between products is adjusted. In actual products, however, such an individual difference exerts an influence not only on the fully closed state but also on an open condition of the throttle valve. Besides, the degree of the influence is not constant continuously from the fully closed state. This is because there is an individual difference also with respect to the degree of change in the intake volume for a change in the throttle valve opening and output characteristics of the opening sensor 91. Consequently, as indicated with broken lines in the graph of FIG. 7, even if adjustment is made so that an error does not exceed ±5% or so in the fully closed state of the throttle valve, it is unavoidable for the error to increase with an increase of the throttle valve opening. In the state of a large throttle valve opening, it is possible that various controls will become rough.

SUMMARY OF THE INVENTION

The present invention has been accomplished for solving the above-mentioned problems of the prior art and it is an object of the invention to provide a throttle valve opening detection device which can cancel an individual difference over a wide range of throttle valve opening and which can detect the throttle valve opening with a high accuracy even in the state of a large valve opening.

According to the present invention, which has been accomplished for solving the foregoing problems, there is provided a throttle valve opening detecting device comprising a sensor interlocked with a throttle valve which adjusts the intake volume for an engine and correction means which produces a correction signal in accordance with an output signal provided from the sensor, the correction means making a zero-point correction for correcting an individual difference associated with the output signal of the sensor at a throttle valve opening (hereinafter referred to as "the first opening") which affords a certain specific engine intake volume ("the first intake volume" hereinafter) and further making a variation characteristic correction for correcting an individual difference in variation characteristics of the sensor output signal relative to a change in the opening of the throttle valve.

Thus, in the throttle valve opening detecting device of the present invention, both zero-point correction and variation characteristic correction are performed by the correction means in order to attain a highly accurate opening detection while canceling an individual difference among throttle valve products, etc. By the zero-point correction is meant to subtract a value corresponding to a certain specific reference opening, i.e., the first opening, from the sensor output signal. By the variation characteristic correction is meant to adjust variations in variation characteristics of the sensor signal when the throttle valve opening changes from the first opening. By these two corrections the individual difference is cancelled over a wide range of throttle valve opening and the detection of the throttle valve opening is effected with a high accuracy not only in the fully closed state or thereabouts but also in the state of a large valve opening.

As methods for making the variation characteristic correction in the throttle valve opening detecting device there are a method wherein the signal after the zero-point correction is multiplied by a predetermined coefficient (the variation characteristic correction by this method will hereinafter be referred to as "the first variation characteristic correction") and a method wherein the reference value for the zero-point correction is varied according to the sensor output signal (the variation characteristic correction by this method will hereinafter be referred to as "the second variation characteristic correction").

In the case of using the first variation characteristic correction, the above correction means produces a correction signal $T_A$ in accordance with the following equation:

$$T_A = (V_A - V_0')\frac{V - V_0}{V' - V_0'} \tag{1}$$

using $V_A$: the sensor output signal $V_0'$: $V_A$ value at the first opening

V': $V_A$ value at a certain specific throttle valve opening ("the second opening" hereinafter) different from the first opening $V_0$: ideal value of $V_0'$ V: ideal value of V'.

The "second opening" indicates a throttle valve opening which affords a certain specific engine intake volume (the "second intake volume" hereinafter) different from the first intake volume.

In actual operation, the sensor interlocked with the throttle valve outputs the signal $V_A$ which varies according to the opening of the throttle valve. In this signal $V_A$, however, there are included variations based, for example, on an individual difference among throttle valve products within the tolerance of components. For this reason, the correction signal $T_A$ is produced by the correction means in accordance with the above equation (1).

First, $V_0'$ is subtracted from the signal $V_A$ to give ($V_A$−$V_0$). As mentioned above, $V_0'$ is the value of $V_A$ at the first opening of the throttle valve. The first opening is a reference opening corresponding to the first engine intake volume. That is, it can be said that $V_0'$ is a reference opening at which the first intake volume is obtained in the throttle valve product concerned. It follows that the value ($V_A$−$V_0'$) indicates a relative opening obtained by subtracting a value corresponding to the reference opening from the sensor output $V_A$ and that it is a value having been subjected to the zero-point correction.

The value ($V_A$−$V_0'$) is multiplied by a coefficient to afford the correction signal $T_A$. The coefficient is a ratio obtained by first subtracting the value of $V_0$ from the value of V and then dividing the resulting difference by a difference obtained by subtracting the value of $V_0'$ from the value of V'. That is, the coefficient in question is the ratio of the difference in the sensor output signal between the first and second openings to the ideal value and the value associated with the throttle valve product concerned. This coefficient is for correcting an individual difference in variation characteristics of the sensor output $V_A$ relative to the valve opening.

The correction signal $T_A$ thus obtained is of a value having been subjected to the correction of variations between individual products on the basis of the sensor output $V_A$ at the two points of the first and second openings, and this value permits a highly accurate detection of the throttle opening of the throttle valve concerned. This correction signal $T_A$ is employable in various controls, including those for calculation of the fuel injection volume and for the operation of an automatic transmission. In this case, it may be multiplied by an appropriate coefficient for conversion into the opening of the throttle valve. On the other hand, in the case of using the second variation characteristic correction, the correction means produces a correction signal $T_A$ using the values of $V_A$, $V_0'$, V', $V_0$ and V and in accordance with the following equations:

$$T_{AMINB} = V' - V + V_0 \tag{2}$$

$$T_{AMIN} = \frac{T_{AMINB} - V_0'}{V' - V_0'}(V_A - V_0') + V_0' \tag{3}$$

$$T_A = V_A - T_{AMIN} \tag{4}$$

First, a difference obtained by subtracting the value of V from the value of $V_0$ is added to the value of V' to obtain a value $T_{AMINB}$ [Equation (2)]. The value $T_{AMINB}$ is a value obtained by subtracting a difference (V−$V_0$) between ideal values of sensor output $V_A$ at both throttle openings from the sensor output V' at the second opening of the throttle valve concerned. It is a value to be subtracted as a value corresponding to the reference opening from the sensor output $V_A$ at the second throttle opening. Next, a value $T_{AMIN}$ is determined using the value of $T_{AMINB}$ and in accordance with the equation (3). The value of $T_{AMIN}$ is indicated with a solid line in the graph of FIG. 5. This graph shows a value to be subtracted as a value corresponding to the reference opening from an arbitrary sensor output $V_A$, and the value is obtained by joining the point (α in FIG. 5) of ($V_0'$, $V_0'$) and the point (β in FIG. 5) of (V', $V_{AMINB}$) with a straight line. The value of $T_{AMIN}$ as a value corresponding to the reference opening is subtracted from the sensor output $V_A$ to obtain the correction signal $T_A$ [Equation (4)].

As is the case with the use of the first variation characteristic correction, the correction signal $T_A$ thus obtained is a value having been subjected to the correction of variations between individual products on the basis of the sensor output $V_A$ at the two points of the first and second openings. It is a value which permits a highly accurate detection of the throttle opening of throttle valve concerned. If the right side of equation (3) is substituted into $T_{AMIN}$ of equation (4) and the right side of equation (2) is substituted into the $T_{AMINB}$, since this is equivalent to equation (1), the process using the first variation characteristic correction and the process using the second variation characteristic correction cannot be said substantially different, with the only difference being recognized in the order of calculation.

As the values of $V_0$ and V, it is desirable to use the values of $V_0'$ and V' in an ideal individual product. In this case, an ideal product composed of only ideally machined parts is provided and, using this product, sensor outputs at two levels of throttle openings are measured and recorded in advance. These values are the values of $V_0$ and V, which are used as standard values in common to all the individual products of the same specification. When each individual product is mounted, the values corresponding to $V_0$ and V in the individual product, namely $V_0'$ and V', are measured and recorded. These values have variations based, for example, on an individual difference among the products within the tolerance of the components relative to the values of $V_0$ and V. Thus, they are peculiar to each individual product. The four values $V_0$, V, $V_0'$ and V' are constants and are used for detecting the throttle valve opening in the actual operation.

As the first opening it is desirable to use the throttle valve opening corresponding to the idling state of the engine, and as the second opening it is desirable to use a throttle valve opening larger than the first opening, more specifically, a throttle valve opening corresponding to the fast idling state of the engine.

In this case, the value of sensor output $V_A$ as measured at the throttle valve opening corresponding to the idling state of the engine is used as $V_0'$ and $V_0$, while the value of sensor output $V_A$ as measured at a larger throttle valve opening, more specifically, at a throttle valve opening corresponding to the fast idling state of the engine, is used as V' and V. Thus, if the throttle valve has an idle adjusting function, it is possible to use that function for determining a required value of sensor output $V_A$.

DETAILED DESCRIPTION OF PREFERRED EMBODIMENTS

Throttle valve opening detecting devices embodying the present invention and each provided in a throttle assembly for adjusting the idling speed not by the use of a bypass passage but by the throttle valve itself will be described in detail hereunder with reference to the accompanying drawings.

(First Embodiment)

(Device Construction)

Figure 1:
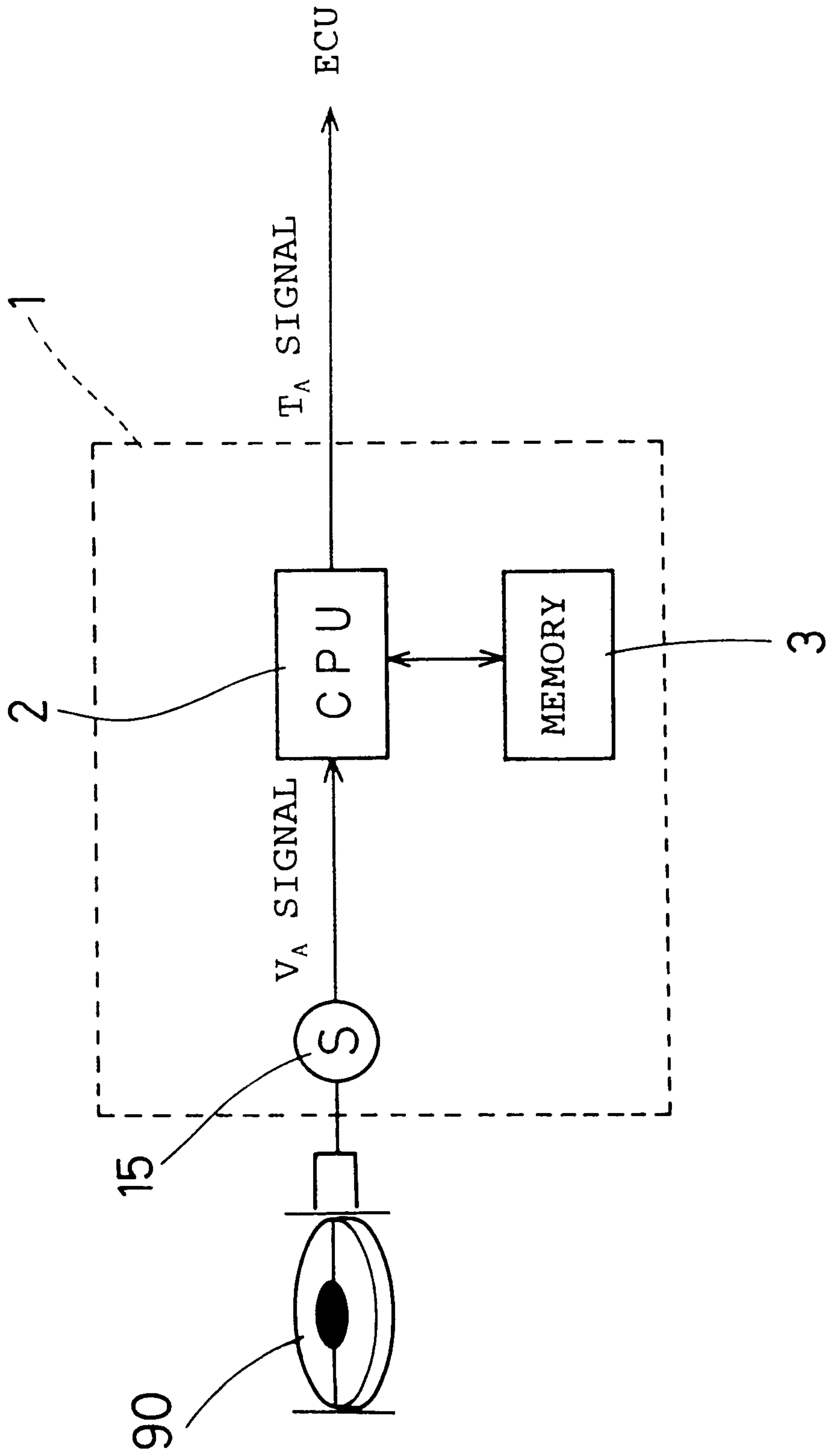
FIG. 1 is a diagram showing a block construction of a throttle valve opening detecting device according to the present invention.

As shown in FIG. 1, a throttle valve opening detecting device 1 according an embodiment of the present invention comprises an opening sensor 15 attached to a throttle valve 90, a CPU 2 which receives a $V_A$ signal from the opening sensor 15 and which outputs a $T_A$ signal to an engine control unit (ECU), and a memory 3 attached to the CPU 2.

Figure 6:
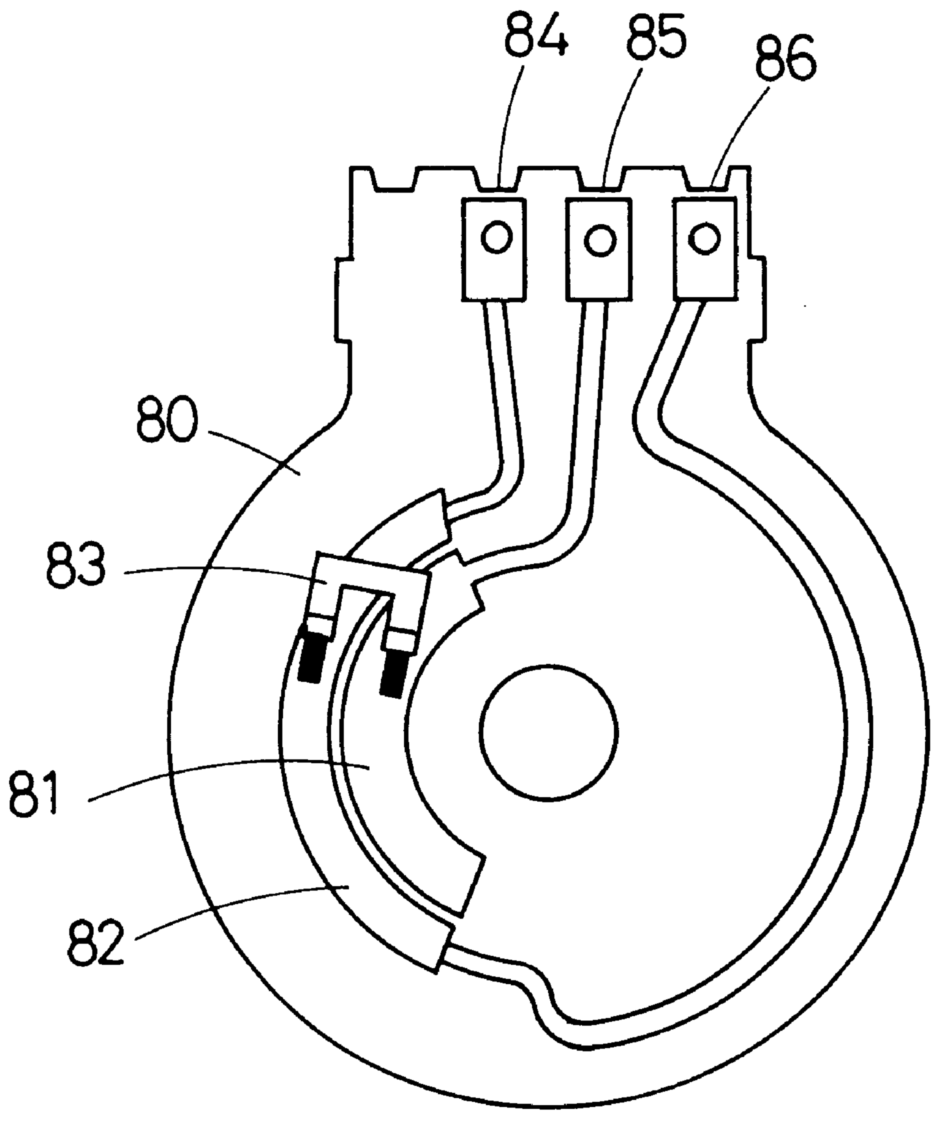
FIG. 6 is a diagram explaining schematically the internal structure of the opening sensor.

The opening sensor 15 has such an internal structure as shown in FIG. 6, in which are mounted a substrate 80 and a slider 83. The substrate 80 is fixed to an outer frame of an opening sensor 91, and on the surface thereof are formed a conductor pattern 81 and a resistor pattern 82 in a double arc shape. The slider 83 is connected to the throttle valve 90 and both ends thereof are in contact with the conductor pattern 81 and the resistor pattern 82 respectively. The contact positions of the slider 83 shift with movement of the throttle valve 90. The resistor pattern 82 is connected to the terminals 84 and 86, while the conductor pattern 81 is connected to a terminal 85. A supply voltage $V_{SS}$ is applied to the terminals 84 and 86. A voltage $V_A$ which appears at the terminal 85 is inputted as $V_A$ signal to the CPU 2.

The CPU 2 is a known processing unit, which performs various processes in accordance with the $V_A$ signal inputted from the opening sensor 15, produces a $T_A$ signal as a correction signal and outputs it to the ECU. The memory 3 attached to the CPU stores programs and numerical values required for the processes.

Figure 2:
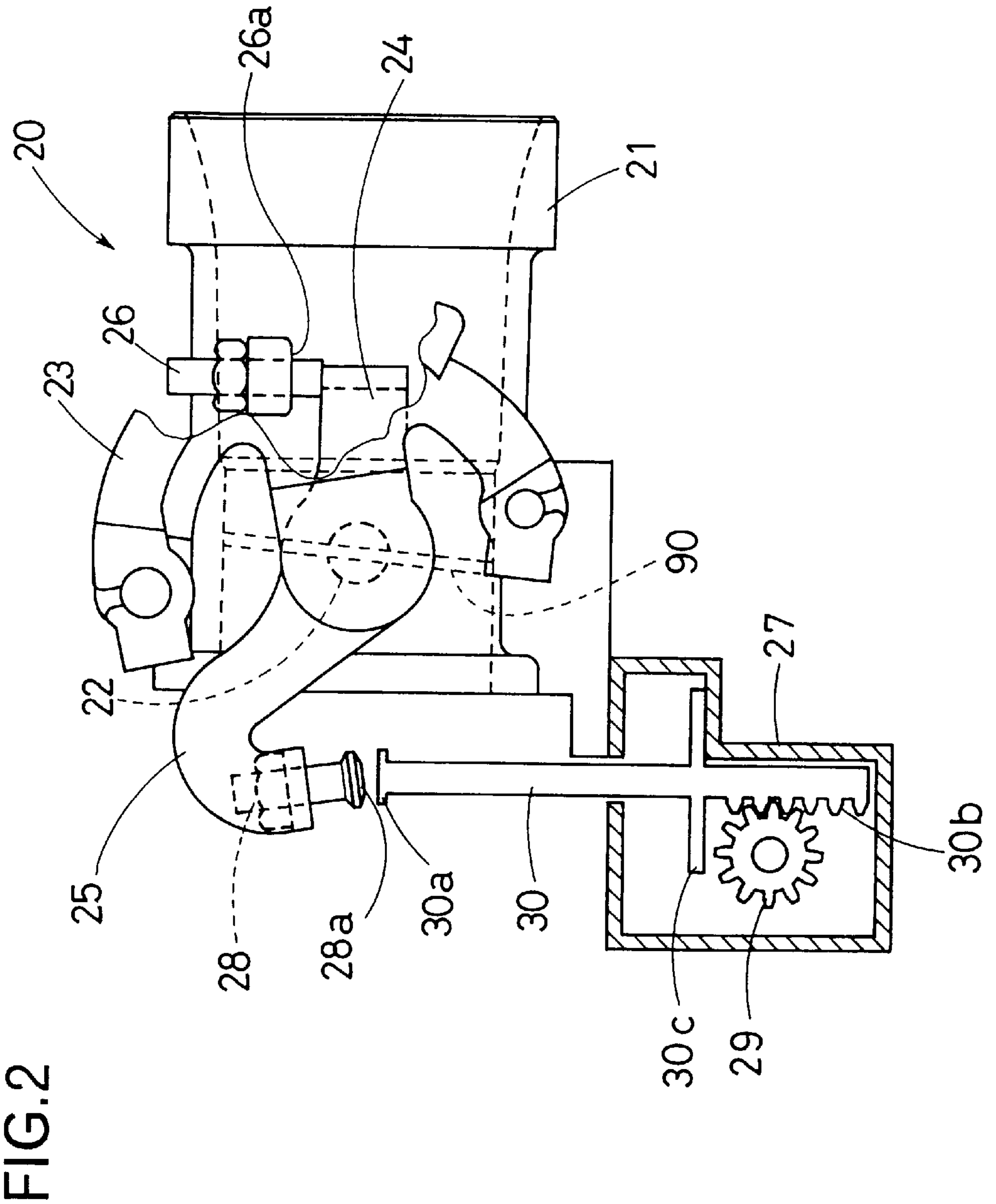
FIG. 2 is a diagram explaining a throttle assembly (in an idling state) to be detected for throttle valve opening.

With reference to FIG. 2, a description will now be given of a throttle assembly to which the throttle valve opening detecting device 1 is attached. The throttle assembly, indicated at 20, mainly comprises a generally cylindrical throttle body 21 and a movable throttle valve 90 disposed inside the throttle body 21. The throttle body 21 is provided with a throttle shaft 22 extending in a direction orthogonal to the axis of the throttle body. The throttle valve 90 is mounted on the throttle shaft 22 so as to be movable together with the throttle shaft to change the opening area of the throttle body 21.

At the position of the throttle shaft 22, a throttle lever 23, a TAS lever 24 and an actuator lever 25 are provided outside (on this side in FIG. 2) the throttle body 21 so as to be rotatable together with the throttle shaft 22. The throttle lever 23 is for transmitting to the throttle shaft 22 the movement of the accelerator pedal which is transferred thereto through a throttle cable. The TAS lever 24 is for transmitting the movement of a TAS (throttle adjusting screw) 26, which will be described later, to the throttle shaft 22. The actuator lever 25 is for transmitting the movement of an adjusting actuator 27, which will be described later, to the throttle shaft 22, with an adjusting screw 28 being attached to front end thereof. To the back side in FIG. 2 is attached the throttle valve opening detecting device 1 so that the slider 83 turns together with the throttle shaft 22. Thus, the throttle valve 90, the throttle lever 23, the TAS lever 24, the actuator lever 25 and the slider 83 are rotatable integrally through the throttle shaft 22.

In addition, both TAS screw 26 and adjusting actuator 27 are provided on the outside of the throttle body 21. The TAS screw 26 is for adjusting the opening of the throttle valve 90 in an idling condition of the engine. When the accelerator pedal is not depressed at all (also when the throttle cable is not entrained on the throttle lever 23), a front end 26*a* of the TAS screw 26 comes into contact with the TAS lever 24.

Figure 3:
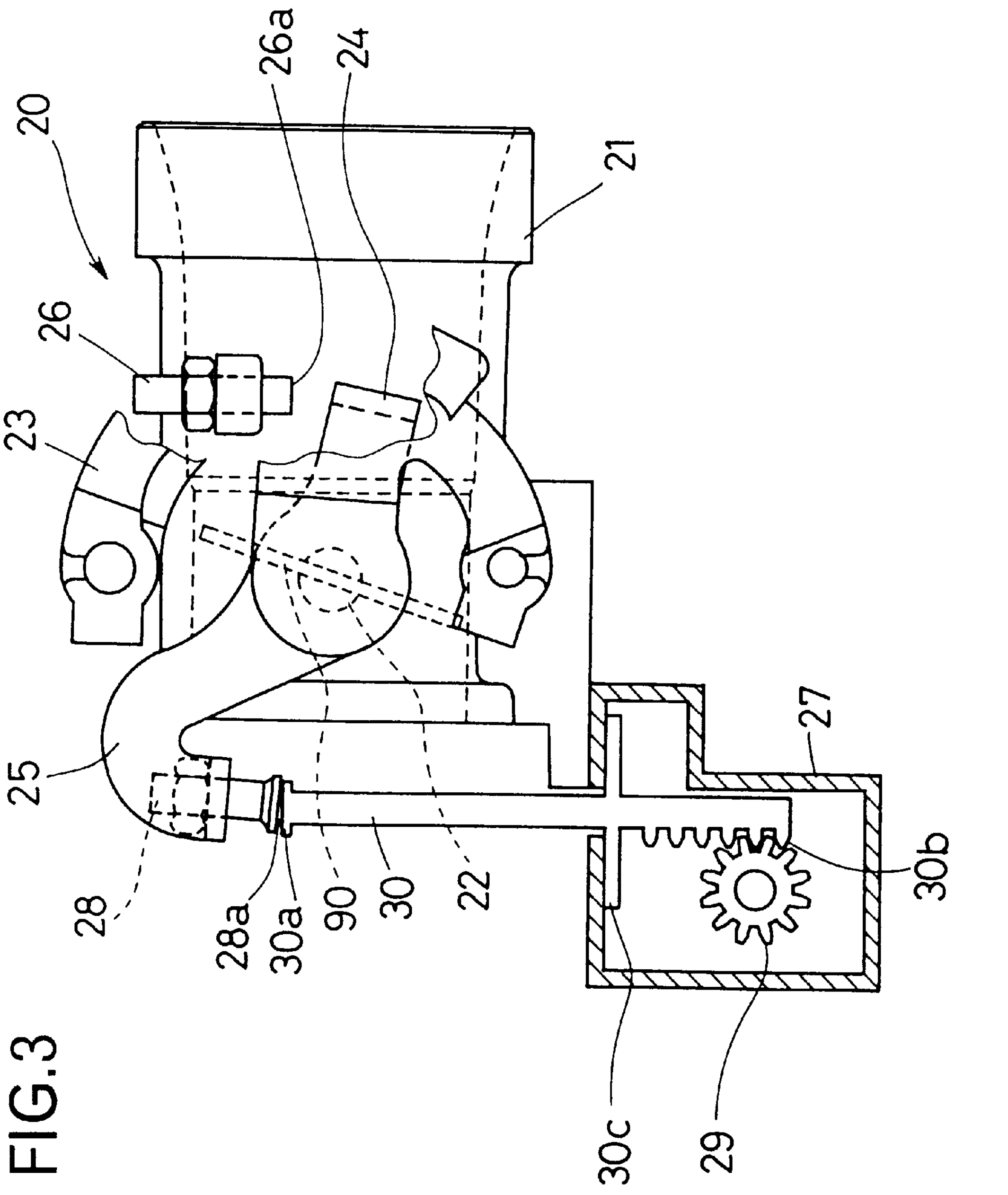
FIG. 3 is a diagram explaining a throttle assembly (in a fast idling state) to be detected for throttle valve opening.

The adjusting actuator 27 primarily aims at making an idling speed control dependent on operating conditions such as a control for increasing the idling speed in a cold state or when an air conditioner is in use. The adjusting actuator 27 has a pinion gear 29 disposed in the interior of the actuator and a rod 30 one end of which projects to the exterior. The rod 30 has meshing teeth 30*b* formed on the portion of the rod opposed to the pinion gear 29 so that the rod 30 moves vertically with rotation of the pinion gear 29 and the projecting length of its front end 30*a* changes. The rod 30 is further provided with a flange 30*c* centrally. The flange 30*c* comes into abutment from the inside with an outer frame of the adjusting actuator 27 to restrict the moving range of the rod 30. When the rod 30 has moved down to the lower limit, the front end 30*a* of the rod and a front end 28*a* of the adjusting screw 28 are not in contact with each other (FIG. 2), while both come into contact with each other when the rod 30 has moved up to its upper limit (FIG. 3). The pinion gear 29 is rotated by means of a stepping motor which is controlled by the ECU.

(Initializing)

The throttle assembly 20 is initialized just after assembly thereof, and the output signal $V_A$ of the opening sensor 15 in a predetermined state is once stored as a necessary numerical value in the memory 3 and then used actually. Therefore, this initialization will now be described. In initializing the throttle assembly 20, variations based, for example, on the machining accuracy of various components of the throttle assembly are taken into account, and numerical values peculiar to this throttle valve product are measured and stored. Also stored are numerical values as measured on an ideal product assembled by using only ideally machined parts. Unless otherwise specified, the concrete values appearing in the following description are based on the assumption that the intake passage diameter of the throttle body 21 is 35 mm.

First, with respect to the throttle assembly 20 of the ideal product, the sensor output is measured in the following procedure. An air pump is mounted downstream of the throttle body 21 and the rod 30 of the adjusting actuator 27 is moved down to its lower end to keep the front end 30*a* and the front end 28*a* out of contact with each other (the state shown in FIG. 2). At this time, since the throttle cable has not been entrained on the throttle lever 23 yet, the front end 26*a* of the TAS screw 26 is in contact with the TAS lever 24.

Then, the air pump is operated for suction and both suction force and opening of the throttle valve 90 are adjusted so as to give a flow rate of 2.0±0.1 (±5%) $m^3/h$ ("idling intake volume" hereinafter) and a negative pressure of −60 rel.kpa. At this time, the adjustment of opening of the throttle valve 90 is performed using the TAS screw 26. This adjusted state corresponds to an idling state of the engine. After the adjustment, the output signal $V_A$ of the opening sensor 15 is read and stored as value $V_0$. This value corresponds to the output of the opening sensor 15 at a throttle opening which affords an idling state in the use of the ideal product of the throttle assembly 20.

Next, the rod 30 of the adjusting actuator 27 is moved up to its upper end, thereby causing the front ends 30*a* and 28*a* to come into contact with each other (the state shown in FIG. 3). At this time, the opening of the throttle valve 90 is in an expanded state by the front end 30*a*. This degree of opening corresponds to the fast idling condition in a cold state or during the use of an air conditioner. In this state, both suction force and opening of the throttle valve 90 are adjusted so as to give a flow rate of 30±1.5(±5%) $m^3/hr$ ("fast idling intake volume" hereinafter) and a negative pressure of −60 rel.kpa. The adjustment of opening of the throttle valve 90 is made using the adjusting screw 28. After the adjustment, the output signal $V_A$ is read and stored as value V. This value corresponds to the output of the opening sensor 15 at a throttle opening which affords the fast idling state in the use of the ideal product of the throttle assembly 20.

Subsequently, with respect to the ordinary product, not the ideal product, of the throttle assembly 20, measurement is made of output signals $V_A$ in the same manner as above with respect to an ordinary product, not the ideal product, of the throttle assembly 20. First, in the same manner as in the case of the ideal product, the rod 30 of the adjusting actuator 27 is moved down to its lower end. In this state both suction force and TAS screw 26 are adjusted so as to give the idling intake volume as the flow rate and a negative pressure of −60 rel.kpa. The output signal $V_A$ of the opening sensor 15 at this time is read and stored as value $V_0'$. This value corresponds to the output of the opening sensor 15 at the throttle opening which affords the idling state in the ordinary product of the throttle assembly 20. Then, the rod 30 of the adjusting actuator 27 is moved up to its upper end and both suction force and opening of the throttle valve 90 are adjusted so as to give the fast idling intake volume as the flow rate and a negative pressure of −60 rel.kpa. The output signal $V_A$ of the opening sensor 15 at this time is read and stored as value V'. This value corresponds to the output of the opening sensor 15 at the throttle opening which affords the fast idling state in the use of the ordinary product of the throttle assembly 20.

Figure 4:
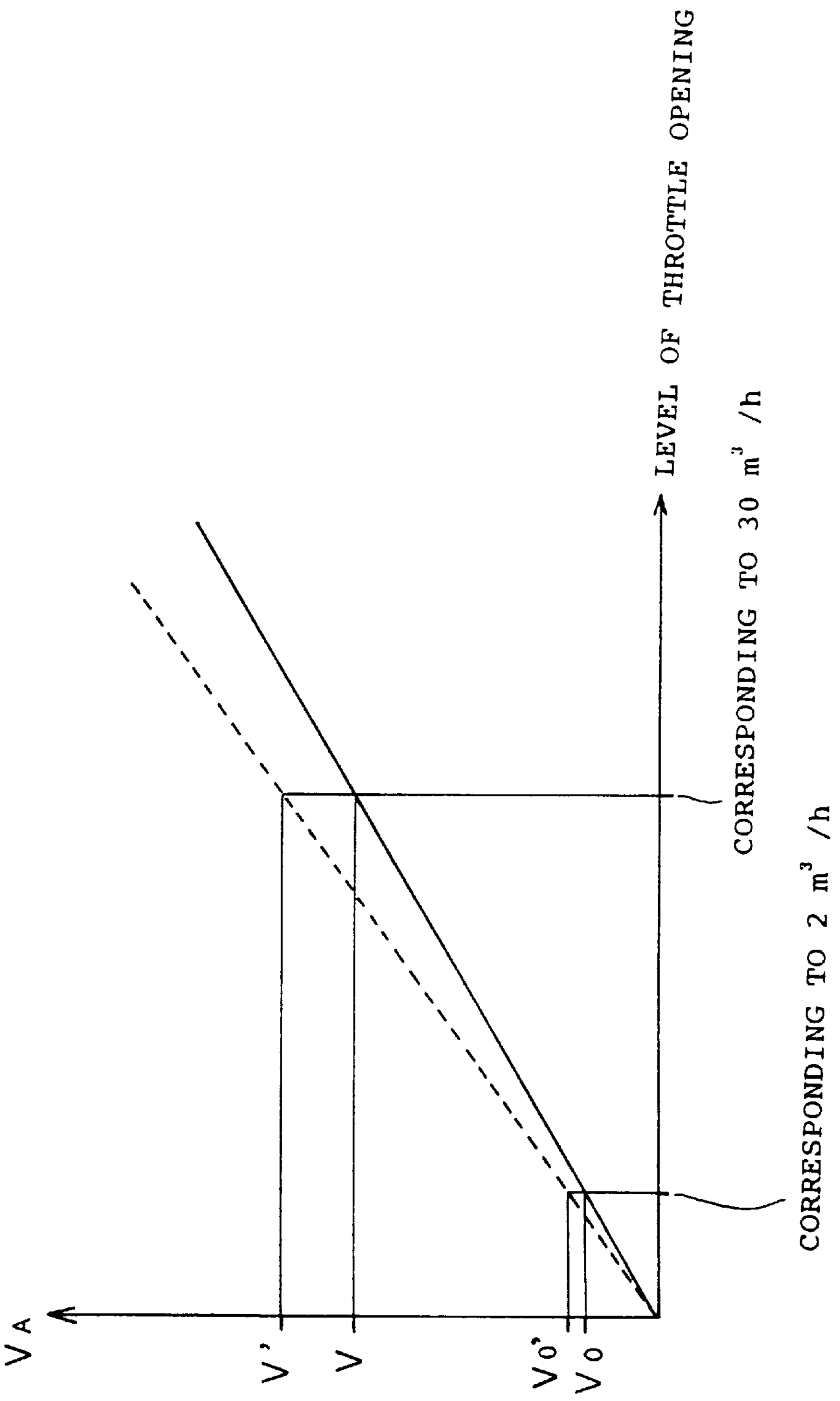
FIG. 4 is a graph explaining a relation between the throttle opening and an output signal from an opening sensor.

The four values $V_0'$, V', $V_0$ and V thus measured correspond to the outputs of the opening sensor 15 obtained at two levels of throttle openings in the use of both ideal product and ordinary product, as shown in the graph of FIG. 4. Those throttle openings are defined so as to be coincident in intake volume. In the graph of FIG. 4, the intake volume is plotted along the axis of abscissa, while the axis of ordinate represents the output signal $V_A$, and the solid line represents an output characteristic of the ideal product, while the broken line represents an output characteristic of the ordinary product. The four values are written and stored in the memory 3, of which the values $V_0$ and V measured on the ideal product are used in common to all the throttle valve products of the same specification. On the other hand, the values $V_0'$ and V' are peculiar to each throttle valve product.

(Detecting Operation)

The following description is now provided about the opening detecting operation for the throttle valve 90 performed by the throttle valve opening detecting device 1. When the throttle assembly 20 is mounted in the engine and is actually in use, a throttle cable is entrained on the throttle lever 23, so that the throttle valve 90 moves interlockedly with depression of the accelerator pedal. A signal $V_A$ proportional to the opening of the throttle valve 90 is outputted from the opening sensor 15 of the throttle valve opening detecting device 1, and a correction signal $T_A$ is produced by the CPU 2 in accordance with the signal $V_A$. In this case, the values $V_0'$, V', $V_0$ and V written in the memory 3 are used and there is adopted the process using the foregoing first variation characteristic correction.

First, the value of $V_0'$ is subtracted from the value of signal $V_A$ to give a difference $U_A(=V_A-V_0')$. This value $U_A$ corresponds to a surplus of the value of signal $V_A$ relative to the value of $V_0'$ which corresponds to the idling value in the use of the throttle valve concerned. Thus, it can be said that the value $U_A$ is a value obtained by subjecting the signal $V_A$ to the zero-point correction using the value $V_0'$. For example, when the value of signal $V_A$ is equal to the value of $V_0'$, that is, at a throttle opening at which the engine intake volume is equal to the idling intake volume, the value of $U_A$ becomes zero.

$$F = \frac{V - V_0}{V' - V_0'} \tag{5}$$

Then, the value $U_A$ is multiplied by a coefficient F defined by equation (5) to calculate a correction signal $T_A$ ($=U_A \times F$). By this correction there is made adjustment for the difference in inclination between the solid line (ideal product) and the broken line (ordinary product) in the graph of FIG. 4. With this correction signal $T_A$, the difference from the value at the throttle valve opening which affords the idling state becomes equal to that in the ideal product. For example, at the throttle opening at which the engine intake volume is equal to the idling intake volume, the value of $T_A$ is zero, while at the throttle opening at which the engine intake volume is equal to the fast idling intake volume, the value of $T_A$ is $(V-V_0)$. This is valid for any individual product insofar as the initialization is performed properly.

Figure 7:
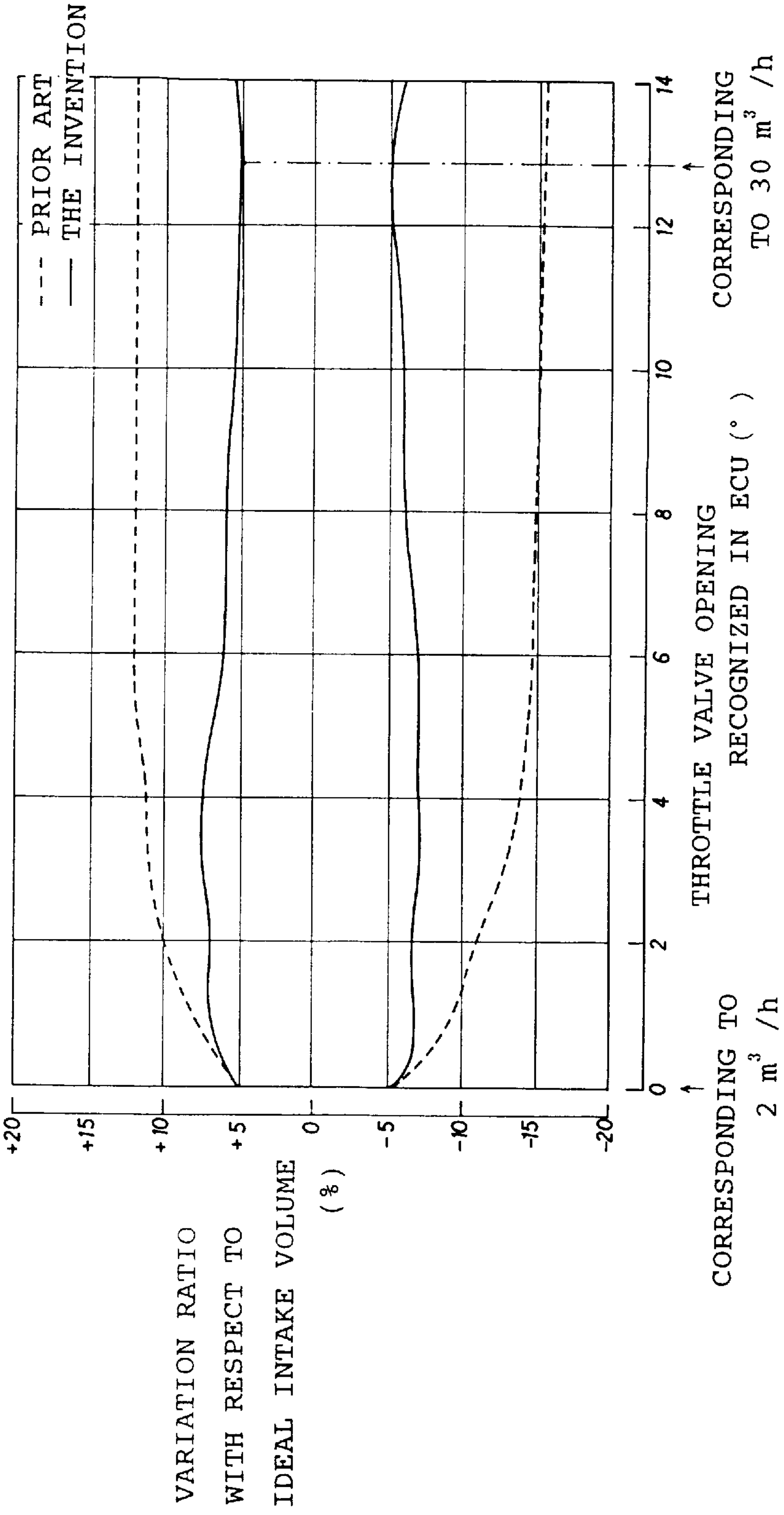
FIG. 7 is a graph explaining variation characteristics of the intake volume.
Figure 8:
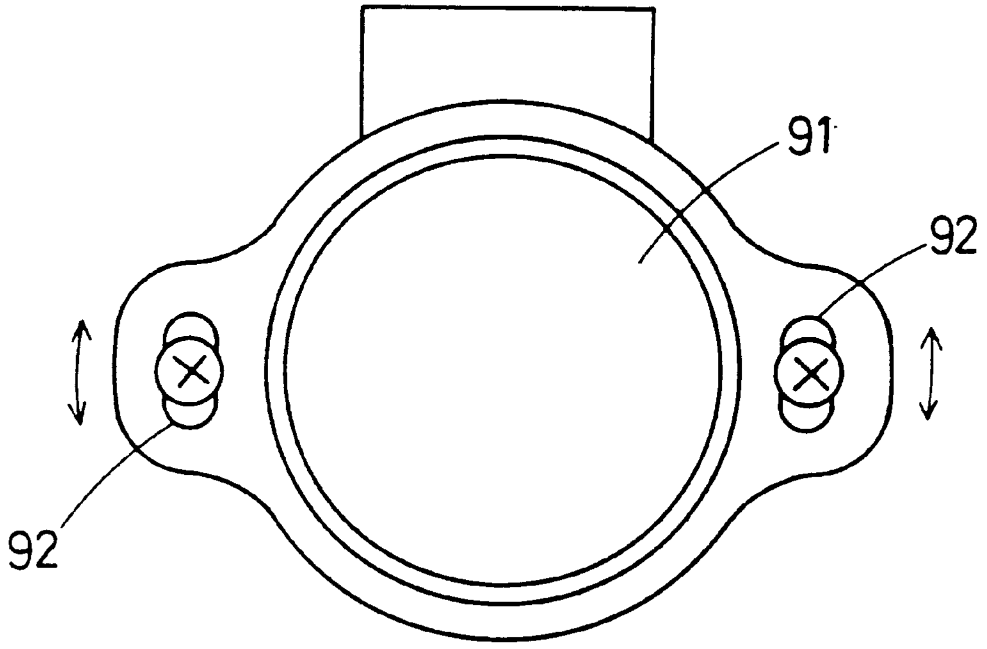
FIG.8 (PRIOR ART)
FIG. 8 is a schematic diagram of a conventional device for detecting the opening of a throttle valve.

More particularly, as indicated with solid lines in the graph of FIG. 7, errors of 5% or so (based on the accuracy of intake volume adjustment in the initialization) at the throttle openings corresponding to the idling intake volume and fast idling intake volume, and even at other throttle openings the errors observed are 7% to 8% or less. In this way the throttle valve opening can be detected with a high accuracy over the whole opening range. Therefore, by recognizing the value of the correction signal $T_A$ as the throttle opening in the ECU there is effected a highly accurate engine control (for example, determination of the fuel injection volume) in which the variations among individual products of the throttle valve assembly 20 are cancelled.

The correction signal $T_A$ has a dimension of voltage and it may be multiplied by an appropriate coefficient in the ECU for conversion into a throttle opening (angle). In this case, however, the angle is not an actual angle, but it takes a value obtained by converting (slope-correcting) the difference (zero-point correction) from the angle in the idling state into an angle in the ideal product. The axis of abscissa in FIG. 7 also represents such converted values into angles.

According to this embodiment, as described above in detail, the output characteristics of the opening sensor 15 are adjusted between the ideal product and the ordinary product at two levels of throttle openings defined in terms of intake volumes in the idling state and the fast idling state, and a deviation of the throttle opening corresponding to the idling state from that of the ideal product is corrected and the output variation characteristic (slope in FIG. 7) of the opening sensor 15 relative to opening variations is corrected. Therefore, a highly accurate detection of the throttle opening which cancels variations between individual products can be done over a wide range, including the area proximate to idling where the throttle opening is small.

Consequently, a signal $T_A$ of the throttle opening coincident with the actual engine intake volume in the use of the ordinary product concerned can be fed to the ECU and thus it is possible to make a highly accurate control for the engine, etc. (control for other portions than the engine may also be included such as control of the speed changing operation of the automatic transmission) under the recognition of a highly accurate throttle opening. Therefore, the engine start-up characteristic, fuel consumption, output, exhaust purifying property and drivability are difficult to be influenced by an individual difference among products, whereby various performances are improved. Besides, the machining accuracy of the constituent parts of the throttle assembly 20 need not be made so strict.

Further, for intake volume adjustment in the idling state during initialization there is used the TAS screw 26 for idling adjustment which is usually employed for the throttle assembly 20, and in the fast idling state there is used the adjusting actuator 27 which is for controlling the idling speed. Thus, any special part need not be added to the throttle assembly 20, that is, the increase in the number of parts is suppressed.

It goes without saying that the present invention is not limited to the above embodiment and that various improvements and modifications may be made within the scope not departing from the gist of the invention. For example, although in the above embodiment the throttle valve 90 in normal operation moves following the movement of the accelerator pedal through a throttle cable, the present invention is also applicable to a throttle valve 90 which is driven not by such a mechanical connection as the throttle cable but by the use of a stepping motor which is controlled by the ECU.

Instead of writing all of the four values $V_0'$, $V'$, $V_0$ and $V$ measured in the initialization into the memory 3, the value of $V_0'$ and that of F in equation (5) may be written into the memory 3. Moreover, a correction signal may be produced using sensor output values at not only two throttle openings in the idling state and fast idling state but also at three or more throttle openings. Not only just after fabrication of the throttle assembly 20 but also periodically there may be performed initialization to cope with secular changes caused by, for example, wear of components and deposition of soot. Further, if an automatic idling-up control is not performed, the adjusting actuator 27 may be removed from the throttle assembly 20 after initialization.

(Second Embodiment)

(Device Construction)

The difference in device construction of the second embodiment from the first embodiment is that the actuator lever 25 in the throttle assembly 20 is not provided with the adjusting screw 28. Therefore, when the rod 30 of the adjusting actuator 27 has been moved up to its upper end, the front end 30*a* of the rod 30 comes into contact with the actuator lever 25 itself. In this state it is impossible to finely adjust the opening of the throttle valve 90. All the other points are the same as in the above first embodiment.

(Initializing)

For both ideal product and ordinary product the measurement of output value of the opening sensor 15 in the idling state is the same as in the first embodiment. That is, with the rod 30 of the adjusting actuator 27 moved down to its lower end, there is made adjustment using the TAS screw 26 so that the intake volume becomes equal to the idling intake volume. In this state the output of the opening sensor 15 is measured and stored as values $V_0'$ and $V_0$. In the fast idling state, the rod 30 of the adjusting actuator 27 is moved up to its upper end, allowing its front end 30*a* to push open the actuator lever 25, and in this state there is made measurement. At this time, the ideal product affords a fast idling intake volume as designed, while the ordinary product affords an intake volume deviated from the fast idling volume by an amount corresponding to the individual difference. In this state the output of the opening sensor 15 is measured and stored as values $V'$ and $V$. It is the same as in the first embodiment that the four values $V_0'$, $V'$, $V_0$ and $V$ are written into the memory 3.

(Detecting Operation)

The opening detecting operation for the throttle valve 90, namely the creation of the correction signal $T_A$ in the CPU 2 based on the output signal $V_A$ from the opening sensor 15, is performed by changing the reference value in the zero-point correction in accordance with the signal $V_A$, not by slope correction, unlike the first embodiment. That is, the processing based on the second variation characteristic correction is used. A concrete procedure is as follows.

First, the value $T_{AMINB}$ is calculated using the three values of $V'$, $V_0$ and $V$. $T_{AMINB}$ is a reference value in the zero-point correction at the throttle opening in the fast idling state. Therefore, a signal difference K ($=V-V_0$) between the idling state and fast idling state in the ideal product is calculated and this value of K is subtracted from $V'$ to give $T_{AMINB}$ [$=V'-K$ ($=V'-V+V_0$), Equation (2)].

Figure 5:
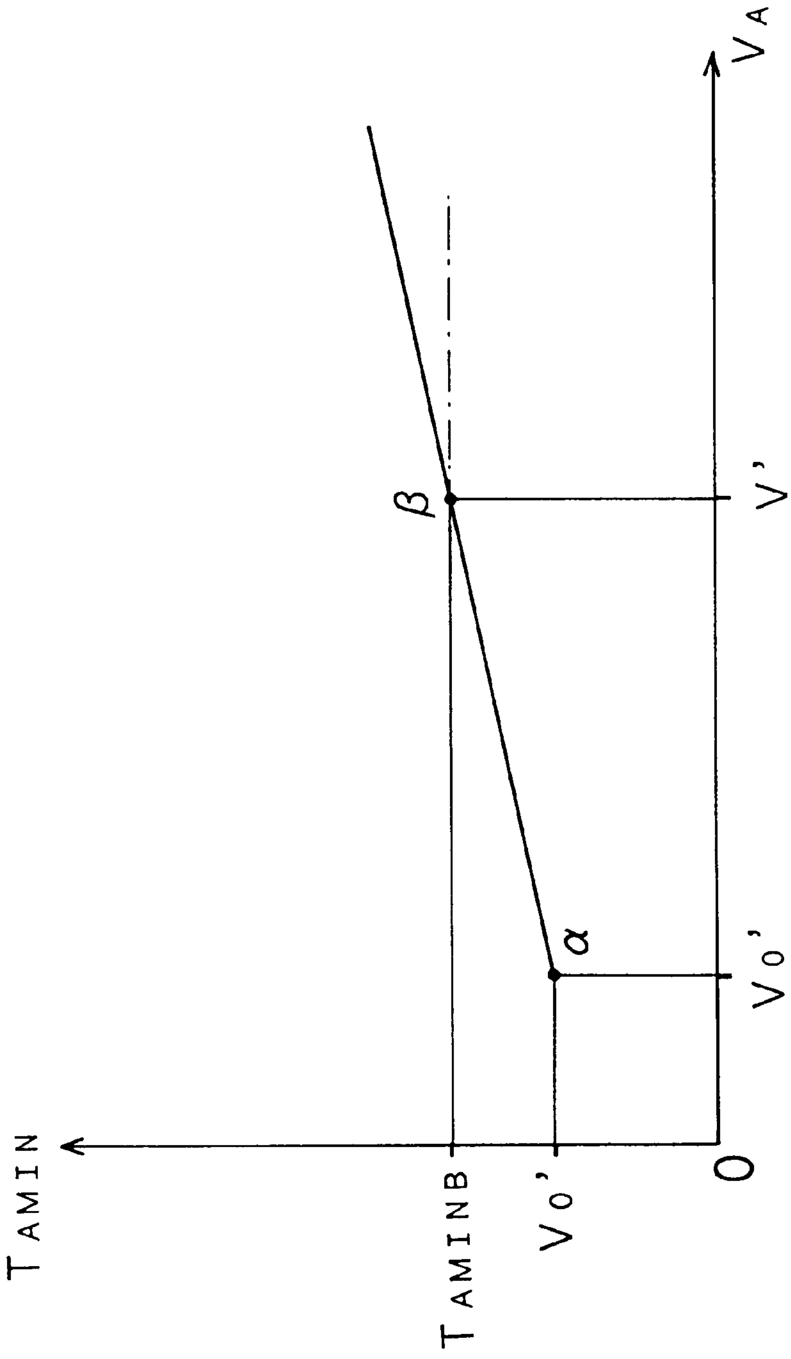
FIG. 5 is a graph explaining in what manner the value of $T_{AMIN}$ is determined.

Next, there is calculated a reference value $T_{AMIN}$ in the zero-point correction relative to an arbitrary value of $V_A$. As shown in FIG. 5, $T_{AMIN}$ is determined by a linear approximation using $V_0'$ (indicated by point $\alpha$) which is the reference value in the idling state and also using the value $T_{AMINB}$ (indicated by point $\beta$) which is the reference value in the fast idling state. This corresponds to the foregoing equation (3).

After the reference value $T_{AMIN}$ for an arbitrary value A has thus been calculated, the value of $T_{AMIN}$ is subtracted from the value of $V_A$ to obtain a correction signal $T_A$ [$=V_A-T_{AMIN}$, Equation (4)]. With this value, the ECU recognizes the throttle opening. In the case where the value of $V_A$ is larger than the value of $V'$, there may be used $T_{AMINB}$ as indicated with a dot-dash line in FIG. 5 instead of using $T_{AMIN}$ of Equation (3) ($T_A=V_A-T_{AMINB}$).

The correction signal $T_A$ thus calculated is used in making the zero-point correction for the output signal $V_A$ of the opening sensor 15 and canceling the individual difference by changing the reference value for the correction with the value of $V_A$. Therefore, as is the case with the first embodiment, the correction signal $T_A$ becomes zero at a throttle opening at which the engine intake volume becomes equal to the idling intake volume. And $(V-V_0)$ is obtained at a throttle opening at which the engine intake volume becomes equal to the fast idling intake volume. This is valid for any individual product insofar as the initialization is performed properly.

According to this second embodiment, as described in detail above, the output characteristic of the opening sensor 15 is adjusted between the ideal product and the ordinary product at two levels of throttle openings in the idling state and the fast idling state to correct a deviation of the throttle opening corresponding to the idling state from that of the ideal product, and the reference value for the correction is changed in accordance with the variation characteristic of the output of the opening sensor 15 relative to a variation of the valve opening. Therefore, as is the case with the first embodiment, a highly accurate throttle opening detection which cancels variations between individual products can be effected over a wide range, with the result that a control for the engine, etc. difficult to be influenced by the individual difference can be effected in the ECU. Particularly, this second embodiment is superior in that the adjusting screw 28 need not be provided in the actuator lever 25.

It goes without saying that, like the previous first embodiment, this second embodiment does not limit the present invention and that modifications may be made within the scope not departing from the gist of the invention.

According to the present invention, as will be apparent from the above description, there is provided a throttle valve opening detecting device capable of effecting a highly accurate detection of the throttle valve opening suitable for the throttle valve product used over a wide range from near the fully closed state of the throttle valve up to a large opening thereof despite an individual difference based on the machining accuracy for the constituent parts of the throttle valve, etc. Such a device permits control of the engine, etc. with a higher accuracy and also permits loosening of the machining accuracy required for the throttle valve and the like.

What is claimed is:

1. A device for detecting and correcting an opening of a throttle valve that determines the intake volume for an engine, comprising:

a sensor interlocked with the throttle valve to provide an output signal corresponding to throttle valve opening; and correction means for producing a correction signal in accordance with the output signal from said sensor, said correction means performing a zero-point correction for correcting the output signal from said sensor at a first throttle valve opening providing a first engine intake volume and a variation correction for correcting a variation of the output signal from said sensor relative to a variation of the throttle valve opening from the first throttle valve opening by multiplying the signal after the zero-point correction by a predetermined coefficient;

wherein said correction means produces a correction signal $T_A$ in accordance with the following equation:

$$T_A=(V_A-V_0')\frac{V-V_0}{V'-V_0'}$$

where $V_A$ is the output signal of said sensor, $V_0'$ is the value of $V_A$ at the first throttle valve opening, $V'$ is the value of $V_A$ at a second throttle valve opening different from the first opening, $V_0$ is an ideal value of $V_0'$, and $V$ is an ideal value of $V'$.

2. A device according to claim 1, wherein $V_1$ is substituted for said $V'$, $V_1$ being a value obtained when the second throttle valve opening provides a second engine intake volume different from the first intake volume.

3. A device according to claim 1, wherein said ideal values $V_0$ and $V$ are selected from a throttle valve product of ideally machined parts and said $V_0'$ and $V'$ are corresponding values in manufactured throttle valve products.

4. A device according to claim 2, wherein said ideal values $V_0$ and $V$ are selected from a throttle valve product of ideally machined parts and said $V_0'$ and $V'$ are corresponding values in manufactured throttle valve products.

5. A device according to claim 1, wherein said first throttle valve opening corresponds to an idling state of the engine, and said second throttle valve opening is larger than said first throttle valve opening.

6. A device according to claim 5, wherein said second throttle valve opening corresponds to a fast idling state of the engine.

7. A device according to claim 4, wherein said first throttle valve opening corresponds to an idling state of the engine, and said second throttle valve opening is larger than said first throttle valve opening.

8. A device according to claim 7, wherein said second throttle valve opening corresponds to a fast idling state of the engine.

9. A device for detecting and correcting an opening of a throttle valve that determines the intake volume for an engine, comprising:

a sensor interlocked with the throttle valve to provide an output signal corresponding to throttle valve opening; and correction means for producing a correction signal in accordance with an output signal from said sensor, said correction means performing a zero-point correction for correcting the output signal from said sensor at a first throttle valve opening providing a first engine intake volume and a variation correction for correcting a variation of the output signal from said sensor relative to a variation of the throttle valve opening from the first throttle valve opening by changing a reference value for the zero-point correction in accordance with the output signal from said sensor;

wherein said correction means produces the correction signal $T_A$ in accordance with the following equations:

$$T_{AMINB}=V'-V+V_0$$

$$T_{AMIN}=\frac{T_{AMINB}-V_0'}{V'-V_0'}(V_A-V_0')+V_0'$$

$$T_A=V_A-T_{AMIN}$$

where $V_A$ is the output signal of said sensor, $V_0$' is the value of $V_A$ at the first throttle valve opening, V' is the value of $V_A$ at a second throttle valve opening different from the first opening, $V_0$ is an ideal value of $V_0$', V is an ideal value of V', $T_{AMINB}$ is a calculated reference value using the values of V', V and $V_0$, and $T_{AMIN}$ is a reference value calculated relative to an arbitrary value of $V_A$.

10. A device according to claim 9, wherein $V_1$ is substituted for said V', $V_1$ being a value obtained when the second throttle valve opening provides a second intake volume different from the first intake volume.

11. A device according to claim 9, wherein said ideal values $V_0$ and V are selected from a throttle valve product of ideally machined parts and said $V_0$' and V' are corresponding values in manufactured throttle valve products.

12. A device according to claim 10, wherein said ideal values $V_0$ and V are selected from a throttle valve product of ideally machined parts and said $V_0$' and V' are corresponding values in manufactured throttle valve products.

13. A device according to claim 9, wherein said first throttle valve opening corresponds to an idling state of the engine, and said second throttle valve opening is larger than said first throttle valve opening.

14. A device according to claim 13, wherein said second throttle valve opening corresponds to a fast idling state of the engine.

15. A device according to claim 12, wherein said first throttle valve opening corresponds to an idling state of the engine, and said second throttle valve opening is larger than said first throttle valve opening.

16. A device according to claim 15, wherein said second throttle valve opening corresponds to a fast idling state of the engine.

* * * * *